United States Patent
Mu et al.

(10) Patent No.: US 6,946,982 B1
(45) Date of Patent: Sep. 20, 2005

(54) MULTI-STANDARD AUDIO PLAYER

(75) Inventors: Keming Mu, Fremont, CA (US); Jun Ying, Shanghai (CN); Xiangfeng Jiao, Shanghai (CN)

(73) Assignee: ArcSoft, Inc., Fremont, CA (US)

( * ) Notice: Subject to any disclaimer, the term of this patent is extended or adjusted under 35 U.S.C. 154(b) by 0 days.

(21) Appl. No.: 10/900,721

(22) Filed: Jul. 27, 2004

(51) Int. Cl.[7] ............................................. H03M 7/00
(52) U.S. Cl. ........................................ 341/50; 700/94
(58) Field of Search ......................... 341/50, 144, 155; 455/89, 95; 700/90, 94; 710/69

(56) References Cited

U.S. PATENT DOCUMENTS

| | | | |
|---|---|---|---|
| 6,782,239 B2 * | 8/2004 | Johnson et al. | 455/42 |
| 6,844,834 B2 * | 1/2005 | Maruya et al. | 341/60 |
| 2003/0210617 A1 * | 11/2003 | Millikan et al. | 369/30.23 |
| 2005/0080743 A1 * | 4/2005 | Ostrover et al. | 705/50 |

OTHER PUBLICATIONS

Texas Instruments, Inc., "Streaming Media." P 1-6, 2003, no month.

Micronas Semiconductor Holding AG, "Preliminary Data Sheet, MAS 3587F MPEG Layer 3 Audio Encoder/Decoder," Edition Nov. 7, 2001.

* cited by examiner

*Primary Examiner*—Peguy JeanPierre
(74) *Attorney, Agent, or Firm*—Patent Law Group LLP; David C. Hsia

(57) ABSTRACT

For a portable video player to encode MP3 audio, a first digital signal processor (DSP) encodes digital signals from an analog/digital (A/D) converter into MP3 data, and a controller reads the MP3 data into a nonvolatile memory. To decode MP3 or MP2 audio, the controller reads MP3/2 data from the nonvolatile memory into the first DSP, and the first DSP decodes the MP3/2 data into digital signals that are provided to a digital/analog (D/A) converter.

For the portable video player to encode a different type of audio, the first DSP is bypassed and a second DSP encodes digital signals from the A/D converter into audio data and writes the audio data into the nonvolatile memory. To decode this different type of audio, the first DSP is bypassed and the second DSP decodes audio data from the nonvolatile memory into digital signals that are provided to the D/A converter.

10 Claims, 4 Drawing Sheets

US 6,946,982 B1

MULTI-STANDARD AUDIO PLAYER

FIELD OF INVENTION

This invention relates to portable media players.

DESCRIPTION OF RELATED ART

Portable video players currently on the market include AV300 from ARCHOS of Irvine, Calif., and Lyra A/V Jukebox from Thomson Consumer Electronics (RCA) of Lancaster, Pa. Typically these devices allow video playback using the MPEG-4 audio/video format and audio playback using the MPEG audio layer 3 or 2 (MP3/2) format.

BRIEF DESCRIPTION OF THE DRAWINGS

Use of the same reference numbers in different figures indicates similar or identical elements.

SUMMARY

In one embodiment of the invention, a portable media player includes an analog/digital (A/D) converter, a first digital signal processor (DSP) coupled to the A/D converter, a second DSP coupled to the A/D converter and a nonvolatile memory, a controller coupled to the first DSP and the nonvolatile memory, and a digital/analog (D/A) converter coupled to the first DSP and the second DSP.

To encode MP3/2 audio in one embodiment of the invention, the first DSP encodes digital signals from the A/D converter into MP3/2 data, and the controller reads the MP3/2 data from the first DSP into the nonvolatile memory. To decode MP3/2 audio in one embodiment of the invention, the controller reads MP3/2 data from the nonvolatile memory into the first DSP, and the first DSP decodes the MP3/2 data into digital signals that are provided to the D/A converter.

To encode a different type of audio in one embodiment of the invention, the first DSP is idled and the second DSP encodes digital signals from the A/D converter into audio data and writes the audio data into the nonvolatile memory. To decode this different type of audio in one embodiment of the invention, the first DSP is idled and the second DSP decodes audio data from the nonvolatile memory into digital signals that are provided to the D/A converter.

DETAILED DESCRIPTION

Figure 1:
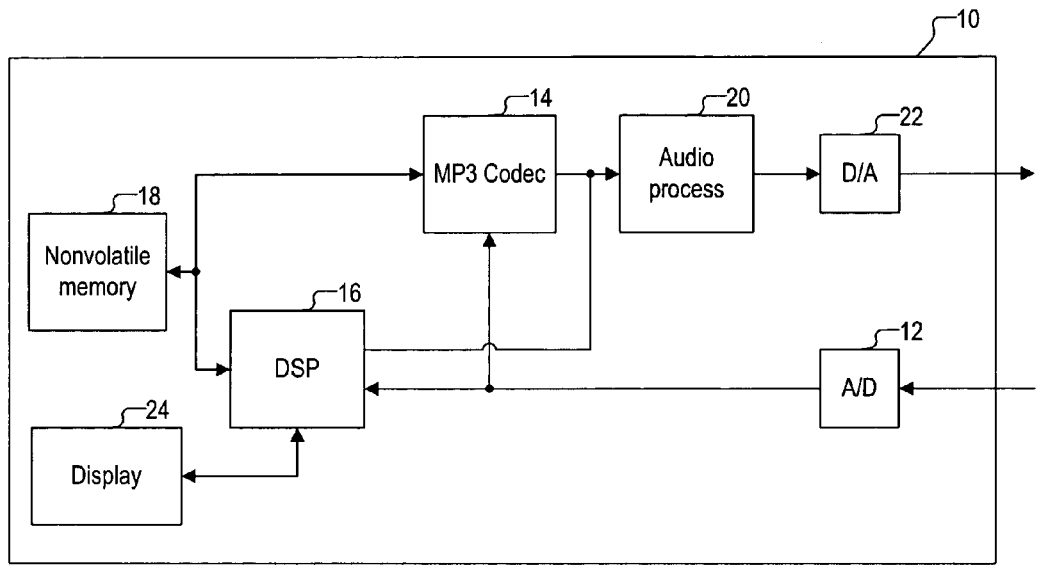
FIGS. 1, 2, and 3 illustrate portable media players in embodiments of the invention.

FIG. 1 illustrates a portable media player 10 in one embodiment of the invention. Player 10 includes an analog/digital (A/D) converter 12 for converting analog audio signals into digital audio signals. The analog audio signals can come from a microphone, a CD player, or any other audio source coupled to player 10. A digital signal processor (DSP) 14 and a DSP 16 are coupled to A/D converter 12 to receive the digital audio signals. In one embodiment, DSP 14 executes a firmware that includes a MPEG audio layer (e.g., MP3, MP2, or both) codec, and DSP 16 executes a firmware that includes a different type of audio codec (e.g., WMA, ACC, or both). In one embodiment, the firmware for DSP 16 also includes a video codec for encoding and decoding videos (e.g., MPEG-4 V1/V2/V3, DivX 3.11/4.0/5.0, Xvid, AVI/ASF, or any combination thereof).

Although DSP 16 can be programmed with firmware to decode MP3/2, the performance may not be satisfactory when DSP 16 is processing audio and video simultaneously (e.g., watching a video and playing or recording music). Thus, a dedicated MP3/2 hardware codec processor (i.e., DSP 14) is provided to improve the overall performance of player 10.

Depending on the recording mode selected by the user, one DSP encodes the digital audio signals into compressed audio data while the other DSP is set in a bypass mode (e.g., set to idle). DSP 14 and DSP 16 are coupled to a nonvolatile memory 18 (e.g., a hard disk or a flash memory card) that stores the compressed audio data.

In the playback mode, the user can select an audio file from nonvolatile memory 18. Depending on the format of the compressed audio data in the audio file, one DSP decodes the compressed audio data into digital audio signals while the other DSP is set in a bypass mode (e.g., set to idle). DSPs 14 and 16 are coupled to an audio processor 20, which processes the digital audio signals according to default settings or user instructions. Audio processing includes adjusting bass, treble, loudness, and automatic volume correction. Audio processor 20 is coupled to a digital/analog (D/A) converter 22, which converts the digital audio signals into analog audio signals for the user. The analog audio signals can be provided to the user by headphones or speakers.

As described above, DSP 16 may also encode and decode videos. In one embodiment, DSP 16 reads compressed video data from nonvolatile memory 18 and decodes them into digital video signals, which are converted to analog video signals for viewing on display module 24.

Figure 2:
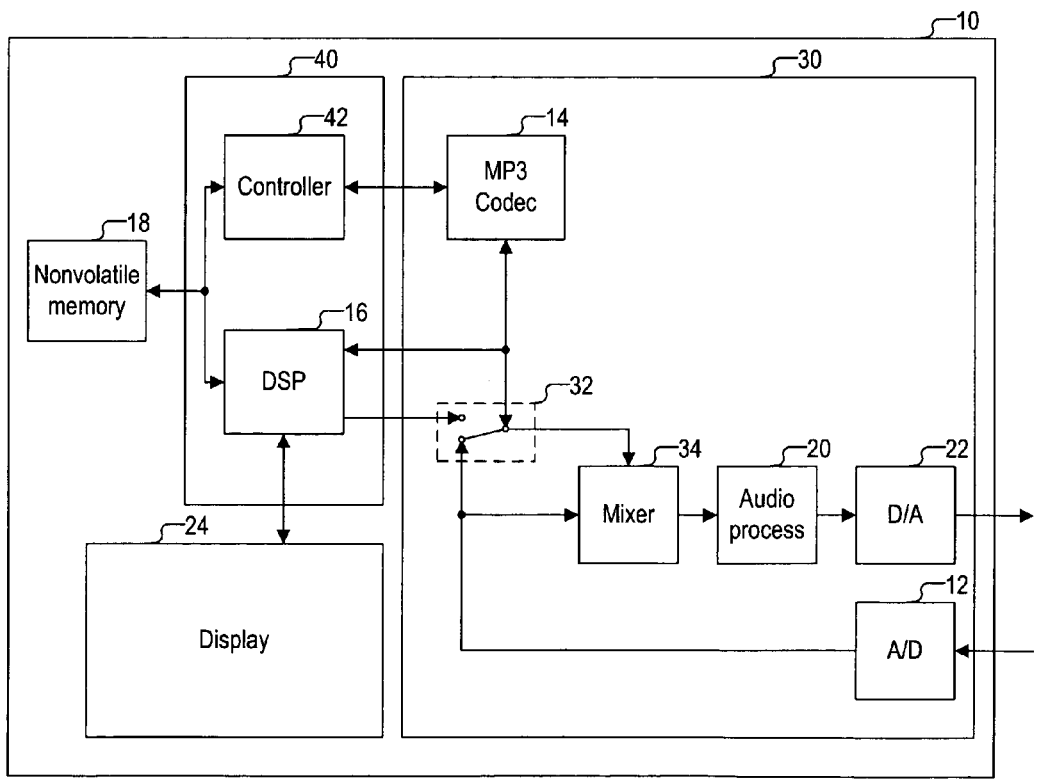

FIG. 2 illustrates an implementation of player 10 in one embodiment of the invention. In this embodiment, player 10 includes a MPEG audio layer codec chip 30 and a media codec chip 40. Chip 30 includes the previously described A/D converter 12, DSP 14, audio processor 20, and D/A converter 22. Furthermore, chip 30 includes a switch 32 and a mixer 34. Chip 40 includes the previously described DSP 16. Furthermore, chip 40 includes a controller 42 that controls the operation of player 10.

To record audio in MP3/2 format, controller 42 (1) sets switch 32 in a down position (as shown) to couple A/D converter 12 to DSP 14 and DSP 16, (2) puts DSP 14 in its encoding mode to encode digital audio signals to MP3/2 data, and (3) and instructs DSP 16 to idle and ignore any digital audio signals that it receives. Once DSP 14 encodes the digital audio signals into MP3/2 data, controller 42 reads the MP3/2 data into nonvolatile memory 18.

To playback audio in MP3/2 format, controller 42 (1) sets DSP 14 in its decoding mode to decode MP3/2 data into digital audio signals, (2) reads the MP3/2 data from nonvolatile memory 18 into DSP 14, and (3) instructs DSP 16 and switch 32 to idle. DSP 14 decodes the MP3/2 data into the digital audio signals, which are mixed by mixer 34 with other digital audio signals, if any. As described above, audio processor 20 processes the digital audio signals and D/A converter 22 converts the digital audio signals into analog audio signals for the user.

To record audio in the other audio format, controller 42 (1) sets switch 32 in a down position (as shown) to couple A/D converter 12 to DSP 14 and DSP 16, (2) puts DSP 16 in its encoding mode to encode digital audio signals, and (3) instructs DSP 14 to idle and ignore any digital audio signals that it receives. DSP 16 encodes the digital audio signals into compressed audio data and writes them into nonvolatile memory 18.

To playback audio in the other audio format, controller 42 (1) sets switch 32 in an up position (not shown) to couple the output of DSP 16 to mixer 34, (2) sets DSP 16 in its decoding mode to decode compressed audio data into digital audio signals, and (3) instructs DSP 14 to idle. DSP 16 then reads the compressed audio data from nonvolatile memory 18 and decodes them into digital audio signals. As described above, the digital audio signals are mixed by mixer 34 with other digital audio signals, if any, and D/A converter 22 converts the digital audio signals into analog audio signals for the user.

Figure 3:
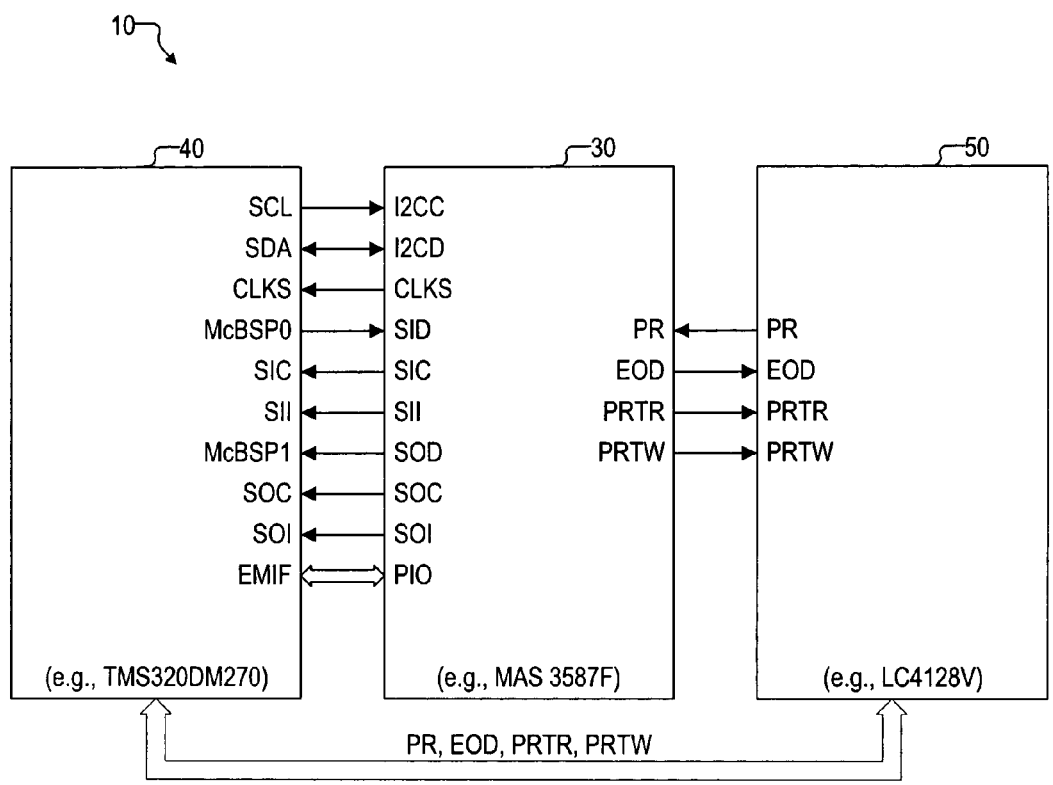

FIG. 3 illustrates the pin connections between chips 30 and 40 of player 10 in one embodiment of the invention. In one embodiment, chip 30 is a MAS 3587F available from Micronas of Zurich, Switzerland, and chip 40 is a TMS320DM270 available from Texas Instrument of Dallas, Tex. The functions of the pin connections between chips 30 and 40 are provided in Table 1 below.

TABLE 1

| Pin on chip 40 (e.g., TMS320DM270) | Pin on chip 30 (e.g., MAS 3587F) | Function |
|---|---|---|
| SCL | I2CC | I²C clock from chip 40 to chip 30 |
| SCA | I2CD | I²C data |
| CLKS | CLKS | System clock from chip 30 to chip 40 |
| McBSP0 | SID | Serial input data from chip 40 to chip 30 |
| SIC | SIC | Serial input clock from chip 30 to chip 40 |
| SII | SII | Serial input word identification from chip 30 to chip 40 |
| McBSP1 | SOD | Serial output data from chip 30 to chip 40 |
| SOC | SOC | Serial output clock from chip 30 to chip 40 |
| SOI | SOI | Serial output word identification from chip 30 to chip 40 |
| EMIF | PIO (e.g., PI12:PI19) | Parallel input/output (PIO) bus between chip 30 and chip 40 |

Chip 30 is further connected to a complex programmable logic device (CPLD) 50. CPLD 50 stores the status of the parallel input/output (PIO) bus between chips 30 and 40 in status registers, which can be read by chip 40 to determine when to read or write to the PIO bus. CPLD 50 also relays requests by chip 40 to read or write to the PIO bus to chip 30. Additionally, CPLD 50 is a programmable interface that takes control and status signals from chip 40 and produces complex control and status signals to other components in the system. In one embodiment, CPLD 50 is a LC4128V from Lattice Semiconductor Corp. of Hillsboro, Oreg. The functions of the pin connections between chip 30/40 and CPLD 50 are provided in Table 2 below.

TABLE 2

| Pin on chip 30 (e.g., MAS 3587F) | Pin on CPLD 50 (e.g., LC4128V) | Function |
|---|---|---|
| PR | PR | Parallel input/output (PIO) DMA request from CPLD 50 to chip 30 |
| EOD | EOD | Indicate PIO end of DMA request |
| PRTR | PRTR | PIO ready to read |
| PRTW | PRTW | PIO ready to write |

For playback of MP3/2 audio in one embodiment of the invention, controller 42 of chip 40 sets control registers and memory of chip 30 using the I²C bus between the chips (i.e., chip 40 is an I²C master device and chip 30 is an I²C slave device). Table 3 lists the control register/memory addresses, values, and functions of a MAS 3587F chip 30 that are set in MP3/2 playback mode.

TABLE 3

| Register/memory address | Value | Function |
|---|---|---|
| D0:7F6 bit[3], bit [2] | 1, 1 | Select DSP 14 to run firmware MPEG layer 2 and layer 3 audio decoders |
| D0:7F1 bit[9:8] | 01 | Enable parallel input at pins PI12: PI19 (PIO) |
| D0:7F1 bit[1] | 0 | Turn PLL off and set MAS 3587F as the clock master |

Figure 4:
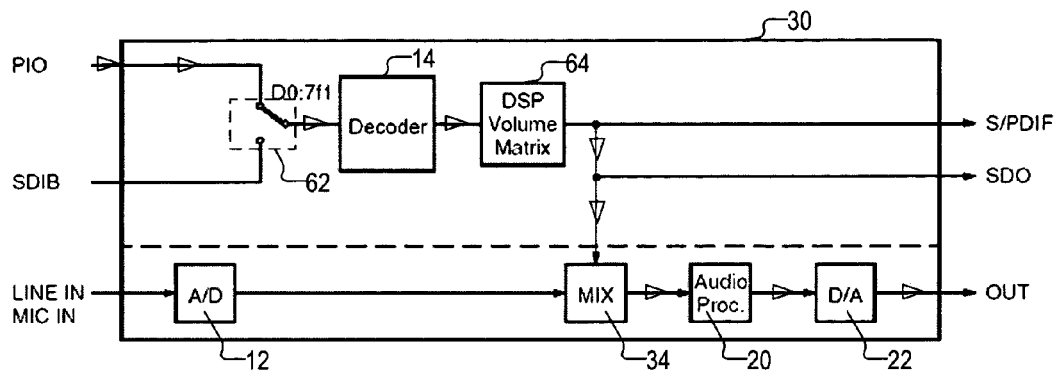
FIGS. 4, 5, 6, and 7 illustrates the data flow through the MPEG layer audio codec chip of the portable media player in one embodiment of the invention.

Under MP3/2 playback/decode mode, chip 40 will output the MP3/2 data through the PIO interface to chip 30. As shown in FIG. 4, the control registers in chip 30 are set so that a switch 62 couples the PIO pins (instead of a serial data interface B pin) to DSP 14, and DSP 14 is set to its decoding mode.

Controller 42 reads the MP3/2 data from nonvolatile memory 18 and writes them onto the PIO pins. DSP 14 reads the MP3/2 data from the PIO pins and decodes them into digital audio signals. DSP 14 is coupled to a DSP volume matrix 64, which performs the balance control and stereo basewidth enhancement for the digital audio signals during decoding. DSP volume matrix 64 is coupled to mixer 34, which then mixes the digital audio signals with other digital audio signals, if any. Audio baseband processor 20 then processes the digital audio signals and the D/A converter 22 converts the digital audio signals into analog audio signals for the user.

For recording/encoding MP3 audio in one embodiment of the invention, controller 42 of chip 40 sets control registers and memory on a MAS 3587F chip 30 as shown in table 4.

TABLE 4

| Register/memory address | Value | Function |
|---|---|---|
| D0:7F6 bit[6] | 1 | Select DSP 14 to run firmware MPEG layer 3 audio encoder |
| D0:7F1 bit[9:8] | 01 | Enable SDI input without PLL |
| D0:7F1 bit[3] | 0 for MPEG2 and 1 for MPEG1 | Set clock |
| D0:7F2 bit[0] | 1 | Use internal A/D converter 12 and disable serial data input at pin SDI |

Figure 5:
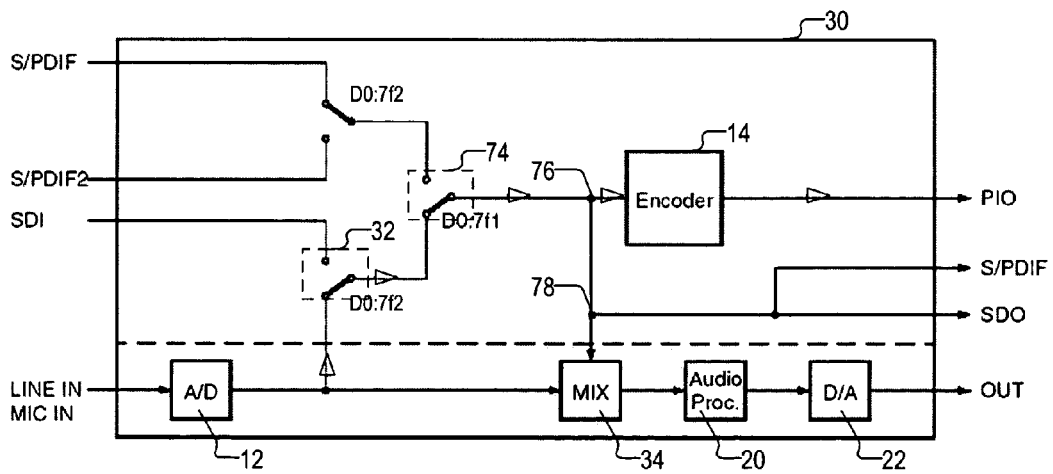

Under MP3 recording/encode mode, chip 40 will read the MP3 data from the PIO interface between chips 40 and 30. As shown in FIG. 5, the control registers in chip 30 are set so that (1) switch 32 is set in a down position to connect A/D converter 12 to a switch 74, (2) switch 74 is set in a down position to couple switch 32 to a common node 76 between DSP 14 and mixer 34, and (3) DSP 14 is set to its encoding mode.

DSP 14 encodes analog audio signals to MP3 data and writes them onto the PIO pins. Controller 42 then reads the MP3 data on the PIO pins and writes them into nonvolatile memory 18.

For playback/decode of another audio format in one embodiment of the invention, controller 42 sets control registers and memory of chip 30 using the I²C bus between the chips (i.e., chip 40 is an I²C master device and chip 30 is an I²C slave device). Table 5 lists the control register/memory addresses, values, and functions of a MAS 3587F chip 30 that are set in this other audio format playback mode.

TABLE 5

| Register/memory address | Value | Function |
| --- | --- | --- |
| D0:7F6 bit[6] | 1 | Select DSP 14 to run firmware MPEG layer 3 audio encoder |
| D0:7F2 bit[3] | 0 | Enable serial data output at pin SDO |
| D0:7F2 bit[0] | 0 | Enable external serial data input at pin SDI |
| D0:7F1 bit[9:8] | 01 | Enable SDI input without PLL |
| D0:7F1 bit[4] | 0 for 32 bits/sample and 1 for 16 bits/sample | Set bits per sample at SDO |

Figure 6:
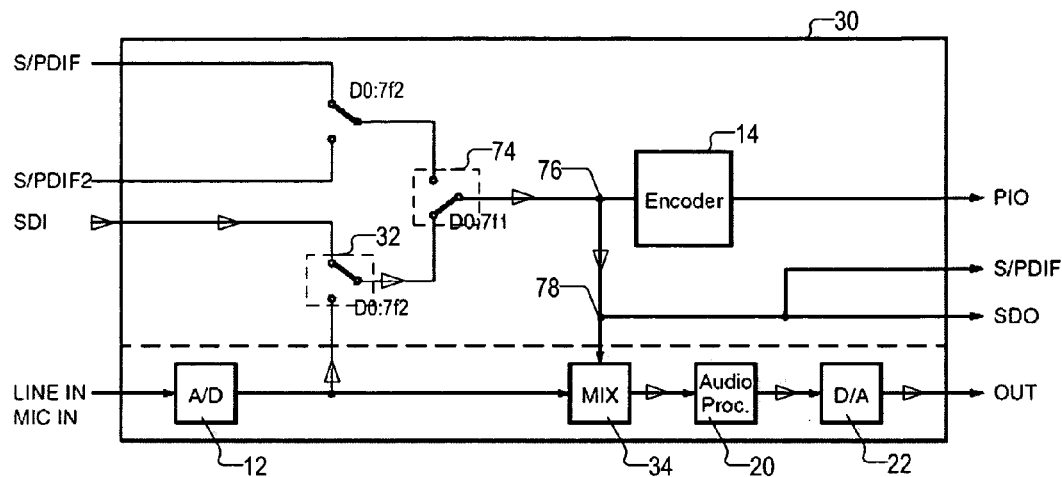

Under this playback/decode mode, the clock of chip 40 is set as salve to chip 30. Chip 40 will decode the compressed audio data and output the digital audio signals through SDI interface to chip 30. As FIG. 6 shows, the control registers in chip 30 are set so that (1) switch 32 is set in an up position to connect the SDI pin to switch 74, (2) switch 74 is set in a down position to couple switch 32 to common node 76 between DSP 14 and mixer 34, and (3) DSP 14 is set to its encoding mode but instructed to idle and ignore the compressed audio data.

DSP 16 decodes compressed audio data from nonvolatile memory 18 into digital audio signals and writes them to the SDI pin. Switches 32 and 74 then passes the digital audio signals from the SDI pin to mixer 34, which mixes the digital audio signals with other digital audio signals, if any. Audio processor 20 then processes the digital audio signals and the D/A converter 22 converts the digital audio signals into analog audio signals for the user.

For recording/encoding in another audio format in one embodiment of the invention, controller 42 of chip 40 sets control registers and memory on a MAS 3587F chip 30 as shown in table 6.

TABLE 6

| Register/memory address | Value | Function |
| --- | --- | --- |
| D0:7F6 bit[6] | 1 | Select DSP 14 to run firmware MPEG layer 3 audio encoder |
| D0:7F2 bit[5] | 1 | Disable S/DIF output |
| D0:7F2 bit[0] | 0 | Enable external serial data input at pin SDI |
| D0:7F1 bit[9:8] | 01 | Enable SDI input without PLL |
| D0:7F1 bit[4] | 0 for 32 bits/sample and 1 for 16 bits/sample | Set bits per sample at SDO |

Figure 7:
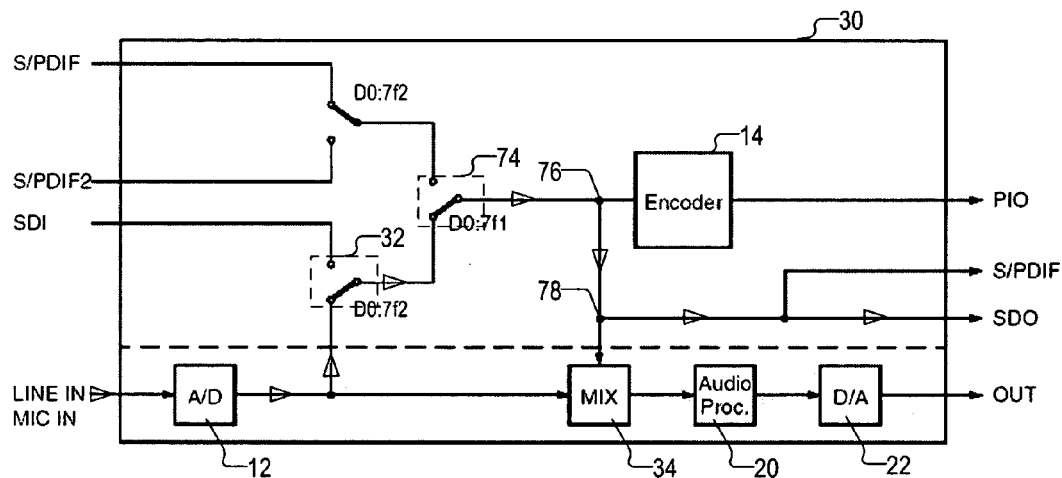

Under this record/encode mode, the clock of chip 40 is set as salve to chip 30. Chip 40 will read the digital audio signals through SDO interface from chip 30 and encode the digital audio signals. As FIG. 7 shows, the control registers in chip 30 are set so that (1) switch 32 is set in a down position to connect A/D converter 12 to switch 74, (2) switch 74 is set in a down position to couple switch 32 to common node 76 between DSP 14 and mixer 34, and (3) DSP 14 is set to its encoding mode but instructed to idle and ignore the digital audio signals. Note that node 76 is further coupled to a common node 78 between mixer 34 and the SOD pin.

Switches 32 and 74 passes the digital audio signals from A/D converter 12 to common node 78. The digital audio signals are then passed onto the SOD pin. The SOD pin is read by DSP 16 to encode the digital audio signals to compressed audio data. DSP 16 then writes the compressed audio data into nonvolatile memory 18.

Various other adaptations and combinations of features of the embodiments disclosed are within the scope of the invention. Numerous embodiments are encompassed by the following claims.

What is claimed is:

1. A portable media player, comprising:
   an analog/digital (A/D) converter;
   a first digital signal processor (DSP) coupled to the A/D converter, the first DSP executing a first firmware comprising an MPEG audio layer 3 (MP3) codec;
   a second DSP coupled to the A/D converter and a nonvolatile memory, the second DSP executing a second firmware comprising an audio codec and an MPEG codec;
   a controller coupled to the first DSP and the nonvolatile memory;
   a digital/analog (D/A) converter coupled to the first DSP and the second DSP;
   wherein:
   in a first mode for encoding audio, the A/D converter converts input analog signals into input digital signals, the first DSP encodes the input digital signals into input MP3 data, the controller reads the input MP3 data into the nonvolatile memory, and the second DSP idles;
   in a second mode for decoding audio, the controller reads output MP3 data from the nonvolatile memory into the first DSP, the DSP decodes the output MP3 data into a first plurality of output digital signals, the D/A converter converts the first plurality of output digital signals into a first plurality of output analog signals, and the second DSP idles;
   in a third mode for encoding audio, the A/D converter converts the input analog signals into the input digital signals, the second DSP encodes the input digital signals into input audio data and writes the input audio data into the nonvolatile memory, and the first DSP idles and ignores the input digital signals;
   in a fourth mode for decoding audio, the second DSP reads output audio data from the nonvolatile memory, decodes the output audio data into a second plurality of output digital signals, the D/A converter converts the second plurality of output digital signals into a second plurality of output analog signals, and the first DSP idles and ignores the second plurality of output digital signals.

2. The portable media player of claim 1, wherein the audio codec comprises at least one of a WMA codec and an AAC codec.

3. The portable media player of claim 2, wherein the MPEG codec comprises at least one of a MPEG-4 codec, a DivX codec, and a Xvid codec.

4. The portable media player of claim 1, wherein the first DSP and the controller are connected by a parallel interface.

5. The portable media player of claim 4, wherein the second DSP and the A/D converter are coupled by a serial interface.

6. The portable media player of claim 5, wherein the second DSP and the D/A converter are coupled by another serial interface.

7. The portable media player of claim 1, further comprising an audio processor between the first DSP and the D/A converter.

8. The portable media player of claim 1, further comprising an audio processor between the second DSP and the D/A converter.

9. A method for operating a portable media player, comprising:
for decoding in an MP3 audio format:
    writing at least a first control bit to cause a first switch to couple parallel input/output (PIO) pins to a first digital signal processor (DSP);
    writing at least a second control bit to cause the first DSP to decode MP3 data and output digital audio signals to a digital/analog (D/A) converter;
    writing MP3 data onto the PIO pins;
    instructing a second DSP to idle;
for encoding in the MP3 audio format:
    writing at least a third control bit to cause a second switch to couple an analog/digital (A/D) converter to a third switch, the A/D converter outputting digital audio signals;
    writing at least a fourth control bit to cause the third switch to couple the second switch to the first DSP;
    writing at least the second control bit to cause the first DSP to encode the digital audio signals and output MP3 data onto the PIO pins;
    reading the MP3 data from the PIO pins and into a nonvolatile memory;
    instructing a second DSP to idle.

10. The method of claim 9, further comprising:
for decoding in another audio format:
    reading compressed audio data from the nonvolatile memory to the second DSP;
    instructing the second DSP to decode the compressed audio data and output digital audio signals onto a serial data input (SDI) pin;
    writing at least the second control bit to cause the second switch to connect the SDI pin to the third switch;
    writing at least the third control bit to cause the third switch to couple the second switch and the D/A converter;
    instructing the first DSP to idle;
for encoding in said another audio format;
    writing at least the third control bit to cause the second switch to couple the A/D converter to the third switch, the A/D converter outputting digital audio signals;
    writing at least the fourth control bit to cause the third switch to couple the second switch to a serial data output (SDO) pin;
    instructing the second DSP to encode the digital audio signals on the SDO pin and output compressed audio data to the nonvolatile memory;
    instructing the first DSP to idle.

* * * * *